(12) United States Patent
Yano et al.

(10) Patent No.: US 7,794,002 B2
(45) Date of Patent: Sep. 14, 2010

(54) STORAGE BOX STRUCTURE IN MOTORCYCLE AND METHOD OF MOUNTING STORAGE BOX

(75) Inventors: Kengo Yano, Saitama (JP); Atsushi Hatayama, Saitama (JP); Michio Atsuchi, Saitama (JP); Kazuhiko Mori, Saitama (JP); Naoki Okada, Saitama (JP); Junichi Sakamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 287 days.

(21) Appl. No.: 12/032,304

(22) Filed: Feb. 15, 2008

(65) Prior Publication Data

US 2008/0211250 A1 Sep. 4, 2008

(30) Foreign Application Priority Data

Feb. 21, 2007 (JP) ............................. 2007-040352
Mar. 30, 2007 (JP) ............................. 2007-094303

(51) Int. Cl.
*B60R 99/00* (2009.01)

(52) U.S. Cl. .................... 296/37.15; 296/37.1; 224/413; 224/427

(58) Field of Classification Search ................ 296/37.1, 296/37.15; 180/219; 224/413, 427
See application file for complete search history.

(56) References Cited

U.S. PATENT DOCUMENTS 4,915,188 A 4/1990 Ota et al.

6,499,784 B2 * 12/2002 Takahashi .................. 296/37.1

FOREIGN PATENT DOCUMENTS

| EP | 0303408 | | 2/1989 |
|----|---------|----|--------|
| EP | 1557349 | A1 | 7/2005 |
| JP | 1-285476 | A | 11/1989 |
| JP | 2005-207038 | A | 8/2005 |
| WO | WO-03/000539 | A1 | 1/2003 |
| WO | WO-2006/120830 | A1 | 11/2006 |

* cited by examiner

*Primary Examiner*—Lori L Lyjak
(74) *Attorney, Agent, or Firm*—Birch, Stewart, Kolasch & Birch, LLP

(57) ABSTRACT

A motorcycle includes a body frame having at least a pair of right and left or front and rear frame members with a storage box that is open upward between the pairing frame members. A riding seat covers the opening end of the storage box from above. The storage box includes a box main body arranged between the pair of frame members with a box constituent member that is detachably mounted below the box main body so as to form an electronic component storage chamber in cooperation with the box main body that composes a part of the wall portion of the storage box. The box constituent member is overlapped with at least a part of the frame members of a pair of frame members viewed in a plane with the box constituent member mounted to the box main body. The box constituent member bulges from the box main body.

19 Claims, 13 Drawing Sheets

STORAGE BOX STRUCTURE IN MOTORCYCLE AND METHOD OF MOUNTING STORAGE BOX

CROSS-REFERENCE TO RELATED APPLICATIONS

The present application claims priority under 35 USC 119 to Japanese Patent Application No. 2007-094303 filed on Mar. 30, 2007 and Japanese Patent Application No. 2007-040352 filed on Feb. 21, 2007 the entire contents of which are hereby incorporated by reference.

BACKGROUND OF THE INVENTION

1. Field of the Invention

The present invention relates to a motorcycle that includes a body frame having at least a pair of right and left or front and rear frame members, a storage box that is open upward among the pairing frame members, and a riding seat that covers the opening end of the storage box from above. More particularly to a storage box structure and a method of mounting a storage box.

In addition, the present invention relates to a motorcycle having: a storage box which is arranged below an openable and closable occupant seat and which permits storage and take-out of goods while the occupant seat is open. A fuel tank is stored in a floor tunnel which is arranged between a pair of left and right foot rest parts where an occupant places his or her feet and which projects upward. An oil-feed lid is openably and closably disposed at the floor tunnel part and which covers an oil-feed cap openably and closably attached to a top part of the fuel tank.

2. Description of Background Art

JP-A No. 2005-207038 discloses a motorcycle in which a storage box is inserted from above and arranged between a pair of right and left upper down frames and a pair of right and left seat rails that compose a part of a body frame.

When the storage box is arranged between the pair of right and left upper down frames and the pair of right and left seat rails, the width of the storage box is limited by the space between the pair of right and left upper down frames and the pair of right and left seat rails. Therefore, the storage capacity of the storage box is limited, and the limitation is imposed on the shape of the storage box. JP-A No. 2005-207038 discloses that a bulging portion extending frontwardly and downwardly is provided at the lower part of the front end of the storage box so as to form a storage space of an electronic component. However, the width of the bulging portion is limited by the space between the pair of right and left upper down frames, so that the capacity is increased only by extending the dimension of the bulging portion to the front. Therefore, it is difficult in the motorcycle to secure the space for increasing the storage capacity of the electronic component between the frame members such as the pair of right and left upper down frames.

In a motorcycle disclosed in JP-A No. 2005-207038, the rear end of an oil-feed lid is disposed at a floor tunnel part in such a manner as to cover an oil-feed port of a fuel tank stored in the floor tunnel part in front of an occupant seat that is attached to a vehicle body frame via a hinge mechanism so as to be capable of being openable and closable from the front side of the motorcycle. A hinge mechanism is provided between the front end of the occupant seat and the front end of a storage box covered by the occupant seat so as to make the occupant seat openable and closable from the rear side of the motorcycle.

However, in the motorcycle disclosed in JP-A No. 2005-207038, the hinge mechanism for the oil-feed lid and the hinge mechanism for the occupant seat are so arranged as to oppose each other in the front-rear direction of the motorcycle. Thus, an attempt to extend the front end of the storage box forward in order to gain the capacity of the storage box only permits the forward extension of the front end of the storage box only within a range in which both hinge mechanisms do not interfere with each other, which limits an increase in the capacity of the storage box. Moreover, it is also required to fit the hinge mechanism for the occupant seat, the hinge mechanism for the oil-feed lid, and the front end of the storage box on the vehicle frame side. The close proximity among both hinge mechanisms and the front end of the storage box makes it difficult to ensure an attaching plate part to be attached to the vehicle frame, which also probably restricts the vehicle frame layout.

SUMMARY AND OBJECTS OF THE INVENTION

An embodiment of the present invention provides a box storage structure in a motorcycle that can readily increase the capacity of a storage box, regardless of the shape of the body frame. In addition, a method of mounting a storage box is provided for readily mounting the storage box having the above-mentioned structure to the body frame.

According to an embodiment of the present invention, a storage box structure in a motorcycle is provided that includes a body frame having at least a pair of right and left or front and rear frame members, a storage box that is open upwardly among the pairing frame members, and a riding seat that covers the opening end of the storage box from above, wherein the storage box is composed of a box main body arranged among the pairing frame members and a box constituent member that is detachably mounted below the box main body so as to compose a part of the wall portion of the storage box and to form an electronic component storage chamber in cooperation with the box main body. The box constituent member is formed to be overlapped with at least a part of the frame members of at least a pair of frame members viewed in a plane with the box constituent member mounted to the box main body, and further to bulge from the box main body.

According to an embodiment of the present invention, the box constituent member is mounted below the box main body, which is arranged among the pair of right and left frame members, from one direction of the lateral direction of the motorcycle. A battery and an electronic component box storing an electronic component are stored in the electronic component storage chamber as arranged side by side in the lateral direction.

According to an embodiment of the present invention, the box constituent member is provided with a cutout portion that nips an electric wire, which is drawn from the electronic component storage chamber to the outside, between the box main body and the cutout portion.

According to an embodiment of the present invention, the riding seat is pivotably journalled to the storage box through a hinge, and an opening through which a damper rod, which is provided between the body frame and the riding seat, penetrates is formed to the box main body at the position apart from the electronic component storage chamber.

According to an embodiment of the present invention, a protrusion portion, which protrudes to the side from a mounting portion of the box constituent member to the box main body is provided to the box constituent member. A cover portion that forms a small storage chamber between the protrusion portion and the cover portion is integrally formed with the protrusion portion so as to be openable and closable.

According to an embodiment of the present invention, a first leg portion that extends toward a support frame, which composes a part of the body frame and is arranged below the storage box, is provided at the bottom part of the box main body. A second leg portion that stores the first leg portion and extends toward the support frame is provided at the bottom part of the box constituent member, and the second leg portion is placed and fixed on the support frame.

According to an embodiment of the present invention, a method of mounting a storage box for assembling the storage box is provided wherein the mounting of the storage box to the body frame includes a step of fixing the box constituent member to the body frame, a step of mounting the box constituent member to the box main body that is arranged among at least the pair of frame members so as to assemble the storage box, and a step of mounting the box main body of the assembled storage box to the body frame, wherein these steps are successively performed.

According to an embodiment of the present invention, a cutout portion is formed to the box constituent member, and when the step of mounting the box constituent member that is mounted to the body frame to the box main body is executed, the box constituent member is mounted to the box main body in such a manner that an electric wire connected to an electronic component that should be stored in the electronic component storage chamber is inserted into the cutout portion, and with this state, the electric wire is nipped between the cutout portion and the box main body.

According to an embodiment of the present invention, the box constituent member that composes the storage box together with the box main body is mounted to the box main body so as to be overlapped with at least a part of the frame members viewed in a plane. Thus, the degree of freedom of the overall shape of the storage box can be enhanced, and the storage capacity can be increased, regardless of the shape of the body frame. Further, the box constituent member is mounted below the box main body so as to form the electronic component storage chamber together with the box main body, whereby the storage capacity can be increased without increasing the width of the opening of the opening end at the upper part of the storage box. Accordingly, it is unnecessary to widen the width of the riding seat above the storage box, whereby foot grounding property of a rider seated on the riding seat is not deteriorated.

According to an embodiment of the present invention, the width of the electronic component storage chamber is increased without being limited by the pair of right and left frame members, which makes it possible to store the battery and the electronic component box as arranged side by side in the lateral direction. Therefore, it becomes unnecessary to secure a free space between the pair of right and left frame members in the longitudinal direction, whereby the degree of freedom of layout can be increased.

According to an embodiment of the present invention, the electric wire can be arranged as nipped between the box main body and the box constituent member that compose tie storage box. Therefore, compared to the case in which an open hole through which the electric wire passes is formed to either one of the box main body and the box constituent member, the operation for drawing the electric wire from the storage box is facilitated, and the degree of freedom for the arrangement layout of the electric wire can be enhanced.

According to an embodiment of the present invention, the damper rod is arranged at the position apart from the electronic component storage chamber, whereby the influence given to the storage capacity of the electronic component storage chamber by the damper rod can be prevented, compared to the case in which the damper rod is arranged in the electronic component storage chamber.

According to an embodiment of the present invention, the small storage chamber can be formed only by the box constituent member. Therefore, the storage capacity can be increased without increasing the number of components, and the degree of freedom of the overall shape of the storage box can be enhanced.

According to an embodiment of the present invention, the box main body and the box constituent member are supported by the support frame at the same position. Accordingly, the number of components can be reduced, compared to the case in which the box main body and the box constituent member are supported at the positions apart from each other.

According to an embodiment of the present invention, the box constituent member can be mounted to the box main body to form the storage box, regardless of whether the box constituent member is overlapped with a part of the pairing frame members when viewed in a plane. In addition, the storage box can be mounted to the body frame. Accordingly, the efficiency of the assembling workability can be enhanced.

According to an embodiment of the present invention, when the box mounted to the box main body in such a manner that, as the electric wire connected to an electronic component that should be housed in the electronic component storage chamber is inserted into the cutout portion of the box constituent member, the electric wire is nipped between the cutout portion and the box main body. Accordingly, the electric wire can be arranged as nipped between the box main body and the box constituent member that compose the storage box. Further, the operation for drawing the electric wire from the storage box is facilitated, and the degree of freedom of the arrangement layout of the electric wire can be enhanced, compared to the case in which an open hole through which the electric wire is penetrated is formed to either one of the box main body and the box constituent member.

According to an embodiment of the present invention, a motorcycle is provided that permits an increase in the capacity of a storage box by permitting a forward extension of the storage box through a compact arrangement of a hinge mechanism for an oil-feed lid, a hinge mechanism for an occupant seat, and the front end of the storage box without their mutual interference.

According to an embodiment of the present invention, a motorcycle having: a storage box is arranged below an openable and closable occupant seat which permits storage and take-out of goods while the occupant seat is open. A fuel tank is stored in a floor tunnel part which is arranged between a pair of left and right foot rest parts where an occupant places his or her feet and which projects upwardly. An oil-feed lid is openably and closably disposed at the floor tunnel part which covers an oil-feed cap that is openably and closably attached to a top part of the fuel tank. A pair of seat hinge mechanisms turnably supporting the occupant seat is provided between both left and right sides of a front end part of the occupant seat and a vehicle body frame. A pair of oil-feed lid hinge mechanisms supporting the oil-feed lid while permitting the oil-feed lid to turn around an axis line parallel to a turning axis line of the occupant seat is provided on the inner side of the seat hinge mechanisms between the rear end part of the oil-feed lid and the vehicle body frame. A lid bracket forming part of both oil-feed lid hinge mechanisms and also shared by both oil-feed lid hinge mechanisms and an attaching plate part provided at a front end part of the storage box are arranged between the pair of left and right seat hinge mechanisms and also fastened together to the vehicle body frame.

According to an embodiment of the present invention, the seat hinge mechanism is formed of a seat bracket fixed to the vehicle body frame and a seat arm provided at the occupant seat, both of which are turnably coupled together via a bolt that permits a fastening and fastening release operation from outside along a width direction of the vehicle body frame.

According to an embodiment of the present invention, the attaching plate part at the front end part of the storage box and the lid bracket are fastened together to the vehicle body frame with a single fastening member capable of fastening in a direction orthogonal to turning axis lines of both the oil-feed lid hinge mechanisms and both the seat hinge mechanisms.

According to an embodiment of the present invention, the lid bracket integrally includes a fastened plate part tilted so as to face diagonally upwardly and rearwardly. A rising plate part rising upwardly from the fastened plate part with support plate parts respectively provided consecutively to both sides of the rising plate part in such a manner so as to turnably support respective lid arms separately included in both oil-feed lid hinge mechanisms and fixed to the oil-feed lid. The fastened plate part is fastened together with the attaching plate part to the vehicle body frame.

According to an embodiment of the present invention, the attaching plate part at the front end part of the storage box is placed from above on a stay provided at the vehicle body frame. The lid bracket is superimposed on the attaching plate part from above and the attaching plate part is fastened to the stay.

According to an embodiment of the present invention, the pair of left and right oil-feed lid hinge mechanisms is provided on the inner side of the pair of seat hinge mechanisms, which is provided between both left and right sides of the front end part of the occupant seat and the vehicle body frame, between the rear end part of the oil-feed lid and the vehicle body frame. The lid bracket shared by both oil-feed lid hinge mechanisms and the attaching plate part provided at the front end part of the storage box are arranged between both seat hinge mechanisms and also fastened to the vehicle body frame. Therefore, the seat hinge mechanisms, the lid hinge mechanisms, and the front end part of the storage box can be arranged as proximally as possible while avoiding their mutual interference without influencing the vehicle body lay out. While increasing the degree of freedom of the vehicle body frame layout, the front end part of the storage box can be extended forward to thereby achieve an increase in the capacity of the storage box. Moreover, the lid bracket, forms part of both of the oil-feed lid hinge mechanisms and is also shared by both of the oil-feed lid hinge mechanisms. The attaching plate part at the front end part of the storage box are fastened together to the vehicle body frame, which can reduce the number of components.

According to an embodiment of the present invention, the seat bracket and the seat arm of the seat hinge mechanism are turnably coupled together via a bolt that permits a fastening and a fastening release operation from outside along the width direction of the vehicle body frame. Therefore, the seat hinge mechanisms can be easily disassembled and then maintenance on the lid hinge mechanisms arranged between both seat hinge mechanisms can be easily performed.

According to embodiment of the present invention, of the lid bracket of the at the front end part of the storage box and the lid bracket are fastened together to the vehicle body frame with the single fastening member capable of being fastened in the direction orthogonal to the turning axis lines of the oil-feed lid hinge mechanisms and the seat hinge mechanisms. Therefore, the storage box and the oil-feed lid hinge mechanisms can be attached to the vehicle body frame with a small number of components.

According to an embodiment of the present invention, of the lid bracket of the oil-feed lid hinge mechanism, the fastened plate part fastened together with the attaching plate part of the storage box to the vehicle body frame is tiled so as to face diagonally in an upward and rearward direction. Therefore, it is easy to operate the fastening member that fastens the fastened plate part and the attaching plate part to the vehicle body frame, which improves the operability in attaching and removing the lid bracket in the oil-feed lid hinge mechanisms and the attaching plate part of the storage box to and from the vehicle body frame.

According to an embodiment of the present invention, the attaching plate part of the storage box is placed from above on the stay on the vehicle body frame side, and the lid bracket is arranged so as to be superimposed on the attaching plate part from above. Therefore, after the storage box that is larger in size than the oil-feed lid is fixed to the vehicle body frame, the oil-feed lid that is smaller in size than the storage box can be attached to the vehicle body frame while being held, which permits achieving an improvement in the efficiency of operability in assembly and disassembly such as maintenance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will be explained below with reference to the embodiment of the present invention shown in the appended drawings.

Figure 1:
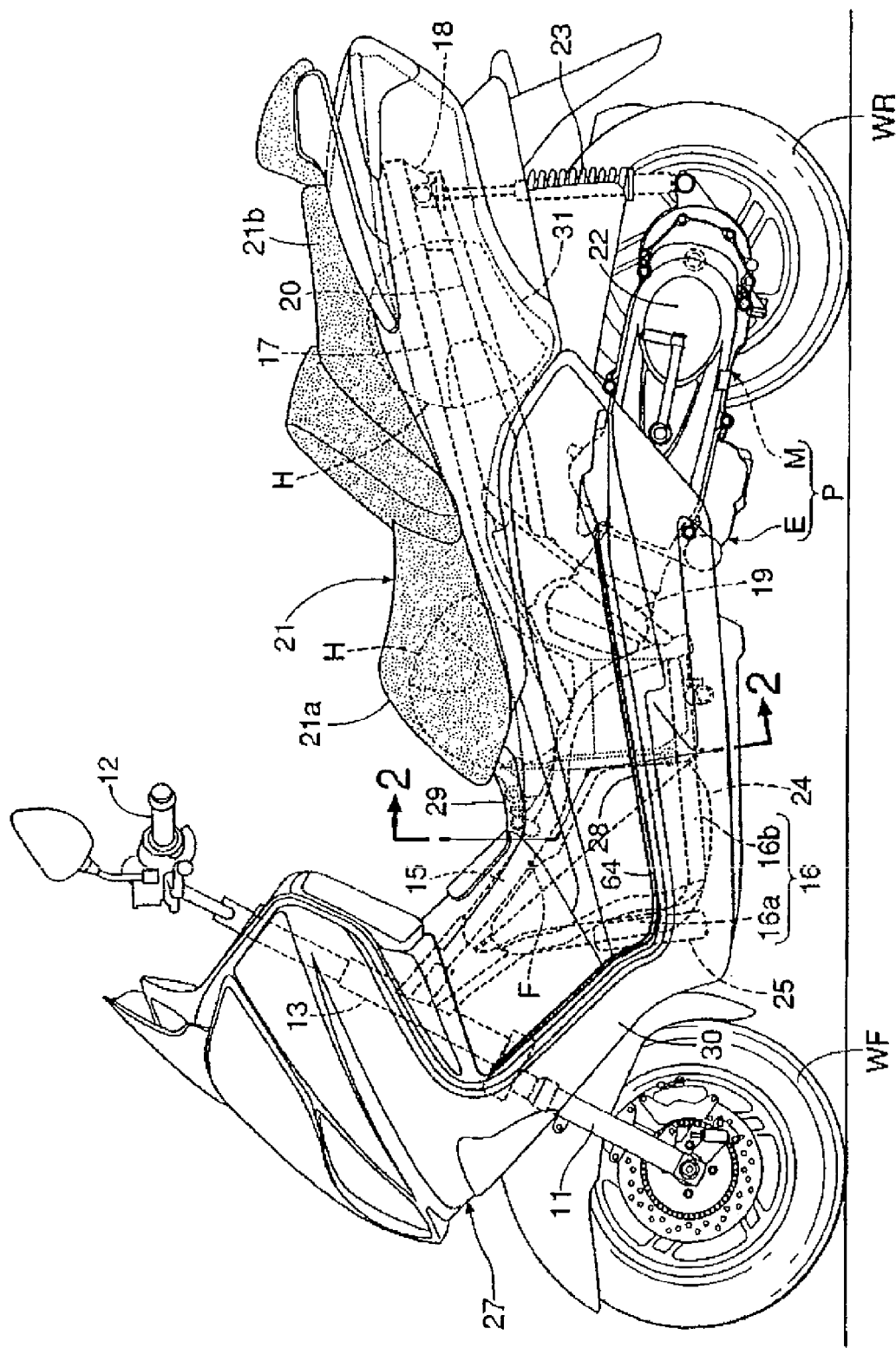
FIG. 1 is a left side view of a motorcycle.

As illustrated in FIG. 1, a body frame F of a scooter-type motorcycle has, at its front end, a front fork 11 that journals a front wheel WF, and a head pipe 13 that steerably supports a steering handlebar 12 that is coupled to the front fork 11. A power unit P that supports a rear wheel WR at its rear end is swingably journalled to the body frame F in the middle thereof in the longitudinal direction.

Figure 2:
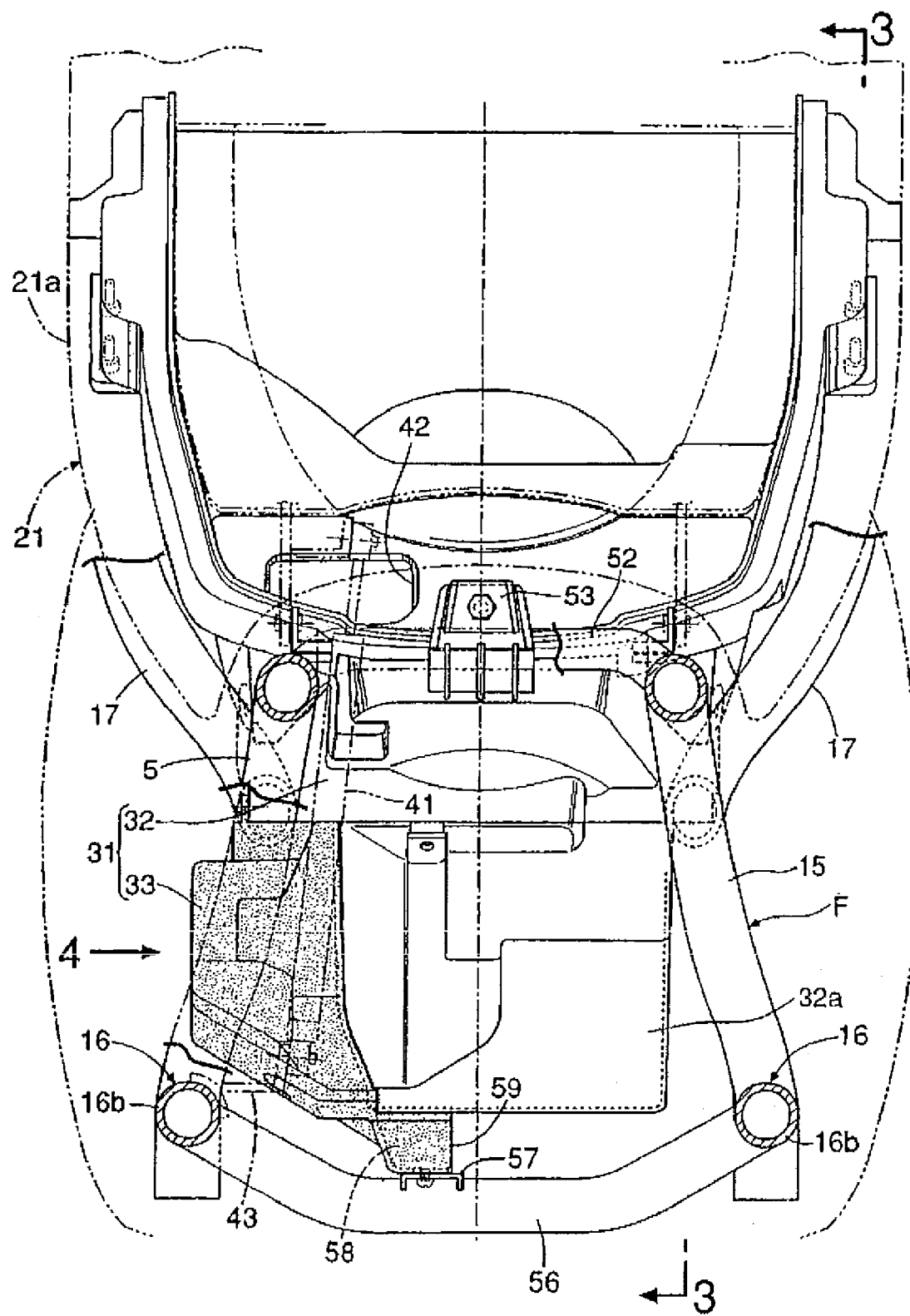
FIG. 2 is a sectional view taken along a line 2-2 in FIG. 1.

Referring to FIG. 2, the body frame F includes the head pipe 13, a pair of right and left upper down frames 15 that are provided consecutively to the head pipe 13 so as to extend downwardly and rearwardly from the head pipe 13, a pair of right and left lower down frames 16 having tilt portions 16a extending downwardly and rearwardly from the head pipe 13 below the upper down frames 15, and horizontal portions 16b integrally provided consecutively at the rear ends of the tilt portions 16a, in which the rear ends of the lower down frames 16 are welded to the rear ends of the upper down frames 15. A pair of right and left seat rails 17 extending upwardly and rearwardly from the middle portion of the upper down frames 15 are provided together with a support plate 18 that extends below from the rear end of the seat rails 17. A pair of right and left joint frames 19, connecting the rear parts of the upper down frames 15 and the middle parts of the seat rails 17, extend upwardly and rearwardly. A pair of right and left rear frames 20 connect the middle parts of the joint frames 19 and the support plates 18. Arranged on the seat rails 17 is a tandem-type riding sheet 21 having a front seat 21a and a rear seat 21b.

The power unit P is composed of a water-cooled engine E whose cylinder axis is forwardly tilted until it becomes substantially horizontal, and a belt-type continuously variable transmission M that is housed in a transmission case 22, which is provided consecutively to the engine E, and that is configured to continuously shift the output from the engine E so as to transmit the output to the rear wheel WR. The rear wheel WR, arranged at the rear right side of the power unit P, is journalled to the rear portion of the transmission case 22. A rear shock absorber 23 is provided between the support plates 18 and the power unit P.

A fuel tank 24 is arranged above the front wheel WF and the riding seat 21 and below the upper down frames 15. A radiator 25 is arranged in front of the fuel tank 24.

The engine E, fuel tank 24, radiator 25, and body frame F in the power unit P are covered by a vehicle body cover 27 made of a synthetic resin. The vehicle body cover 27 includes a pair of right and left step floors 28 on which legs of a rider seated on the riding seat 21 are positioned. A floor tunnel 29 rises upwardly between the step floors 28 with a pair of right and left leg shields 30 rising upwardly from the front portions of the step floors 28 so as to cover the legs of the rider, places on the step floors 28, from the front.

Referring to FIGS. 3 to 6 together, a storage box 31 is supported to the body frame F. The storage box 31 opens upwardly between the rear portions of a pair of right and left upper down frames 15, which constitutes a part of the body frame F, and a pair of right and left seat rails 17, for storing a helmet H or the like. The upper opening end of the storage box 31 is covered from above by the riding seat 21.

The storage box 31 is composed of a box main body 32 that is made of a synthetic resin and arranged among the rear portions or a pair of right and left upper down frames 15, a pair of right and left seat rails 17, and a pair of right and left rear frames 20, and a box constituent member 33 that is made of a synthetic resin and detachably mounted to the box main body 32 so as to constitute a part of the wall portion of the storage box 31. In FIGS. 2 to 6, the box constituent member 33 is indicated as shaded for clearly distinguishing from the box main body 32.

The box main body 32 integrally has a hanging portion 32a that hangs down from the front portion thereof. The right side of the hanging portion 32a is cut out so as to be open to below, the front, and the right side. The box constituent member 33 is attached to the lower part of the front side of the box main body 32, i.e., to the hanging portion 32a, with a plurality of screw members 34, from one direction in the lateral direction (from the right in this embodiment) in such a manner that the box constituent member 33 covers the cutout portion of the hanging portion 32a of the box main body 32.

Further, the box constituent member 33 is formed so as to be overlapped with the rear portion of the right upper down frame 15 of the pair of right and left down frames 15 and the right seat rail 17 of the pair of right and left seat rails 17 viewed in a plane as attached to the box main body 31, as well as to be bulged toward the right side from the box main body 32.

The box constituent member 33 is attached to the hanging portion 32a of the box main body 32 so as to form an electronic component storage chamber 35 in cooperation with the box main body 32. In the electronic component storage chamber 35, a battery 36 and a fuse box 37, which is an electronic component box storing electronic components, are stored as arranged side by side in the lateral direction of the motorcycle, in which a part of the fuse box 37 is stored at the side of the box constituent member 33.

The electronic component storage chamber 35 is covered from above by a cover member 38 in the storage box 31. The cover member 38 is fastened to the box main body 32 with a screw member 39. The cover member 38 can be opened by loosening the screw member 39 for removal.

Figure 3:
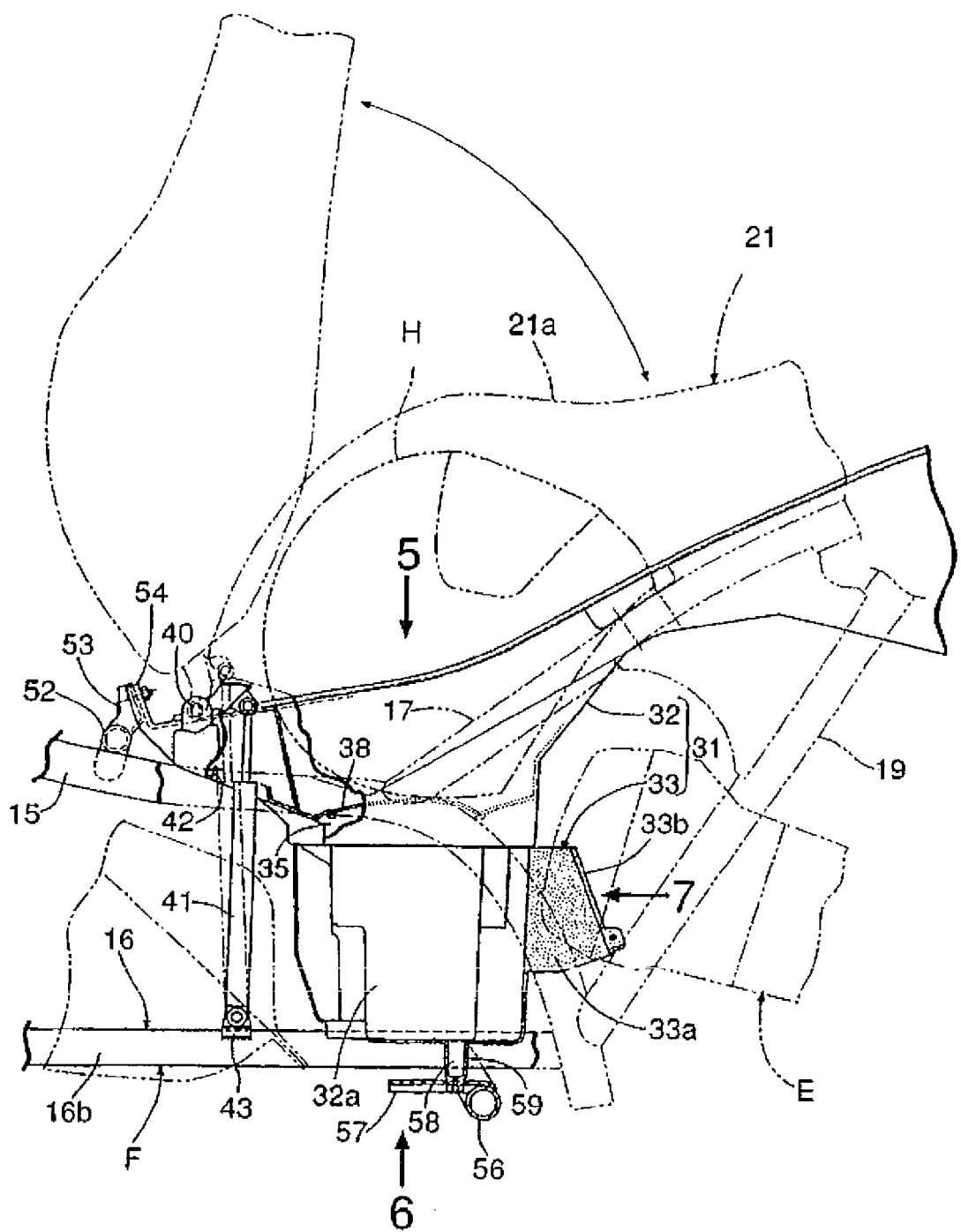
FIG. 3 is a partially cutout left side view seen from the direction of a line 3-3 in FIG. 2.
Figure 4:
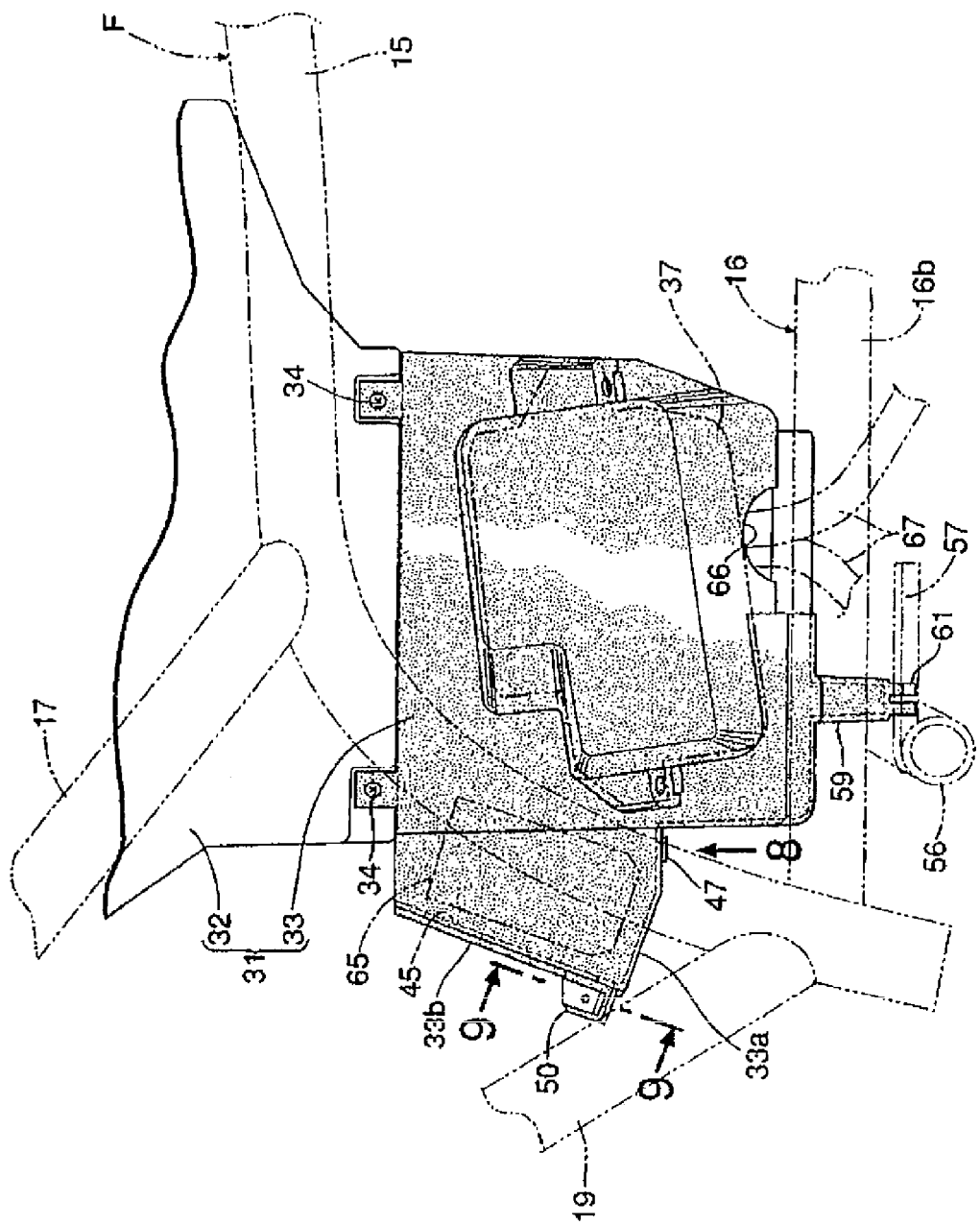
FIG. 4 is a right side view seen from the direction of an arrow 4 in FIG. 2.

Meanwhile, the front end portion of the front seat 21a of the riding seat 21 is pivotably journalled to the upper front end of the box main body 32 of the storage box 31 through a hinge 40. As shown in FIG. 3, the front seat 21a is pivoted to the front side so as to be capable of opening the upper front end of the storage box 31. A damper rod 41 is provided between a stay 43 fixed to the horizontal portion 16b of the right lower down frame 16 of the pair of right and left down frames 16 of the body frame F and the front seat 21a. An opening 42 through which the damper rod 41 penetrates is formed at the box main body 32. This opening 42 is formed at the front right side of the box main body 32 so as to be apart from the electronic component storage chamber 35. An opening 44 for venting air at the side of the engine E upon replenishing water to the radiator 25 is formed at the right side of the box main body 32 at the rear of the electronic component storage chamber 35.

Figure 7:
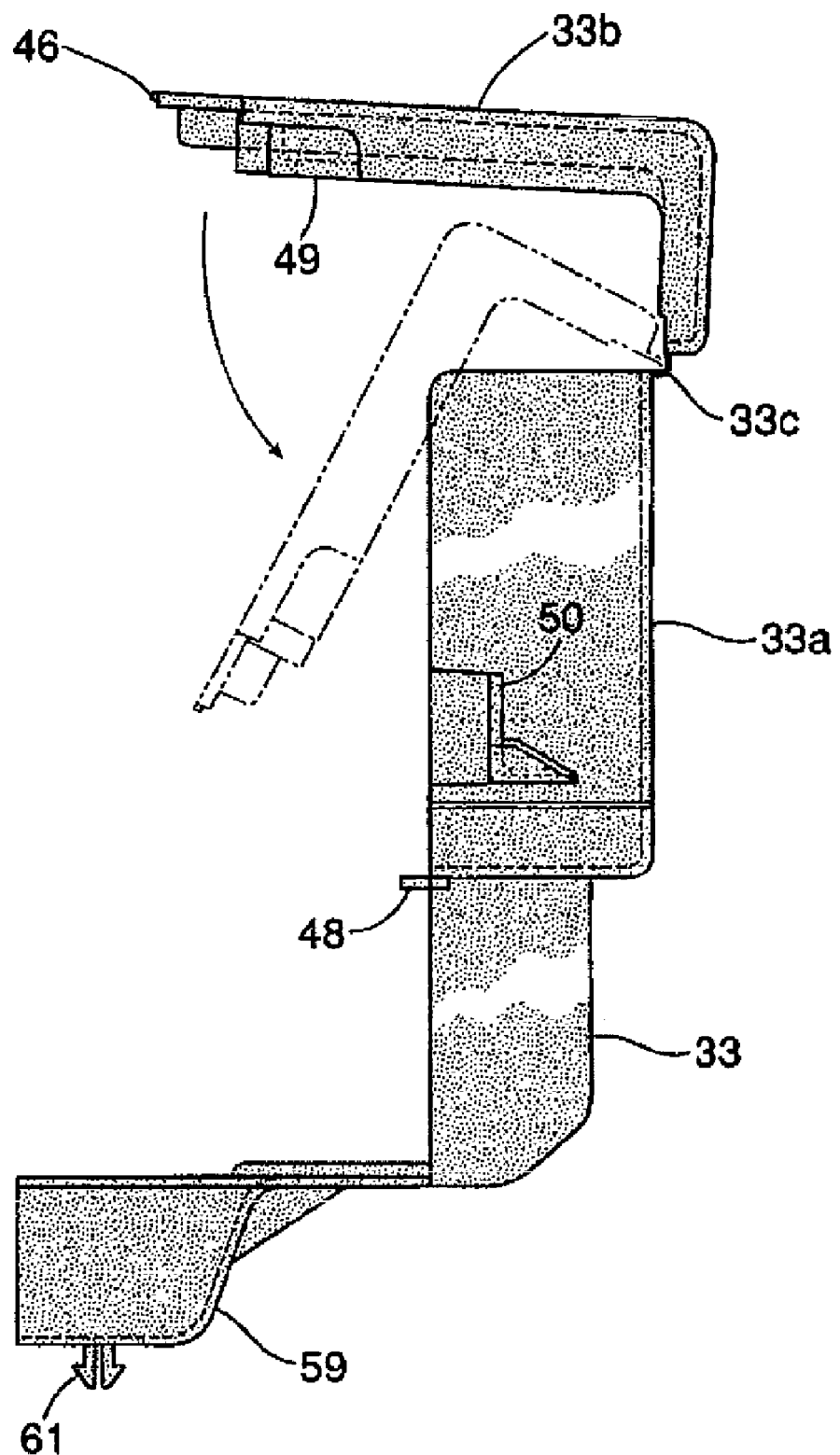
FIG. 7 is a view of a box constituent member viewed from the direction of an arrow 7 in FIG. 3.

The box constituent member 33 is provided with a protrusion portion 33a that protrudes to the side (to the rear in this embodiment) from the mounting portion of the box constituent member 33 to the box main body 32. A cover portion 33b that forms a small storage chamber 45 between the cover portion 33b and the protrusion portion 33a is consecutively and integrally provided to the protrusion portion 33a through a hinge portion 33c having a thin thickness, as shown in FIG. 7. The cover portion 33b can be opened or closed by bending the hinge portion 33c. The small storage chamber 45 communicates with the electronic component storage chamber 35. A starter magnet 65, for example, is stored in the small storage chamber 45.

Figure 8:
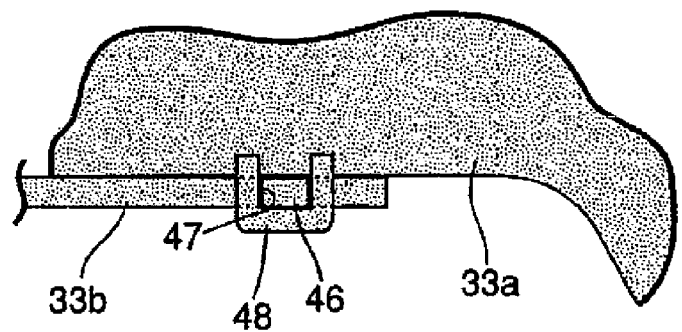
FIG. 8 is an enlarged view seen from the direction of an arrow 8 in FIG. 4.
Figure 9:
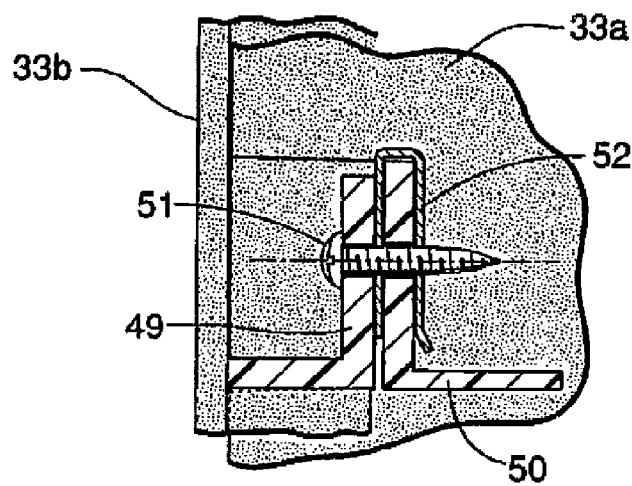
FIG. 9 is an enlarged sectional view taken along a line 9-9 in FIG. 4.

An engagement projection 46 is projectingly provided at the end portion of the cover portion 33b that is opposite to the hinge portion 33c. As shown in FIG. 8, the protrusion portion 33a is provided with an engagement projection 48 that forms an engagement hole 47 with which the engagement projection 46 is engaged by insertion with the cover portion 33b closed. The protrusion portion 33b is further provided with a mounting plate portion 50 that comes in contact with a mounting plate portion 49 with the cover member 33b closed. Both of the mounting plate portions 49 and 50 are fastened to each other with a screw member 51 and a clip nut 52 as shown in FIG. 9.

Figure 5:
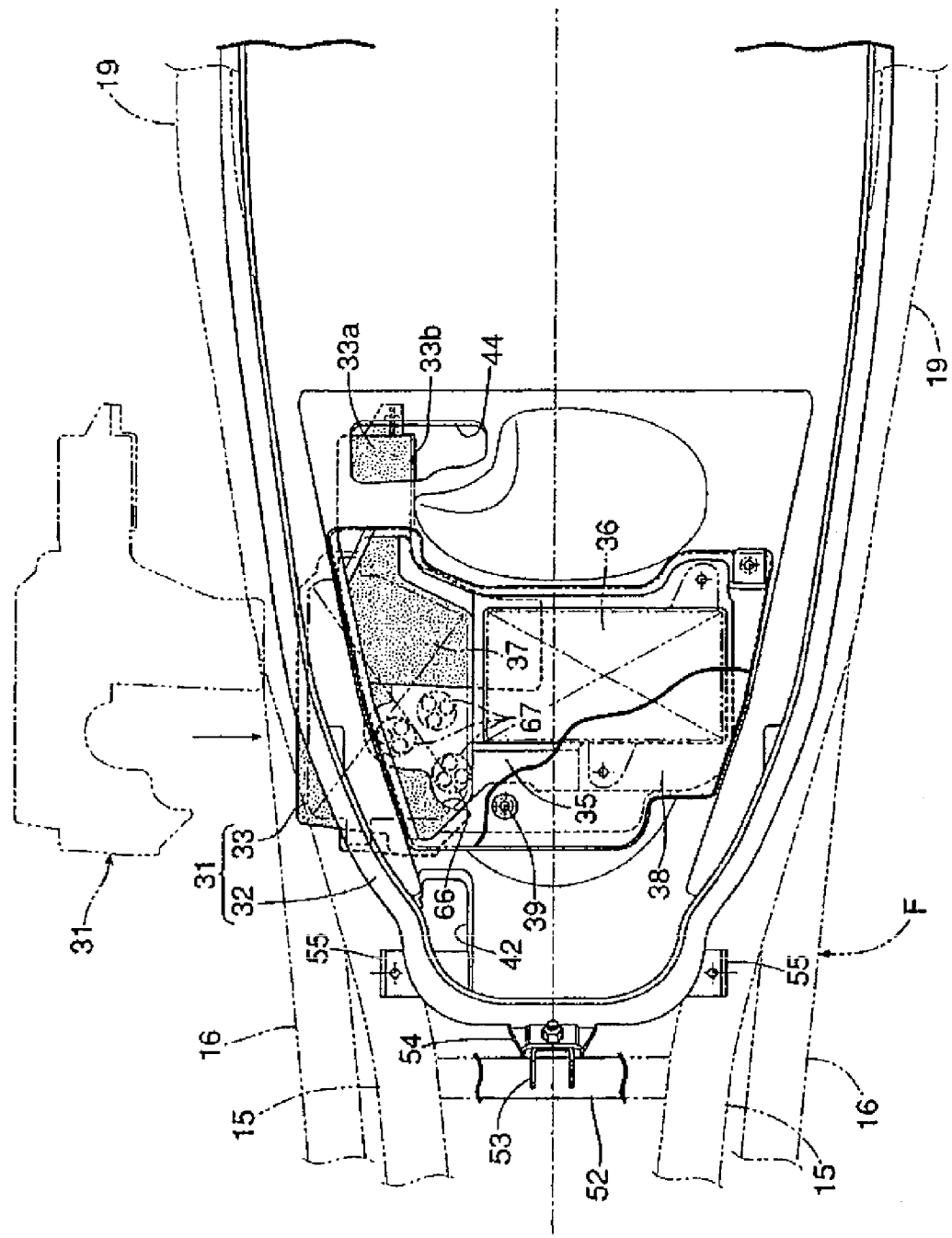
FIG. 5 is a plan view seen from the direction of an arrow 5 in FIG. 3.
Figure 6:
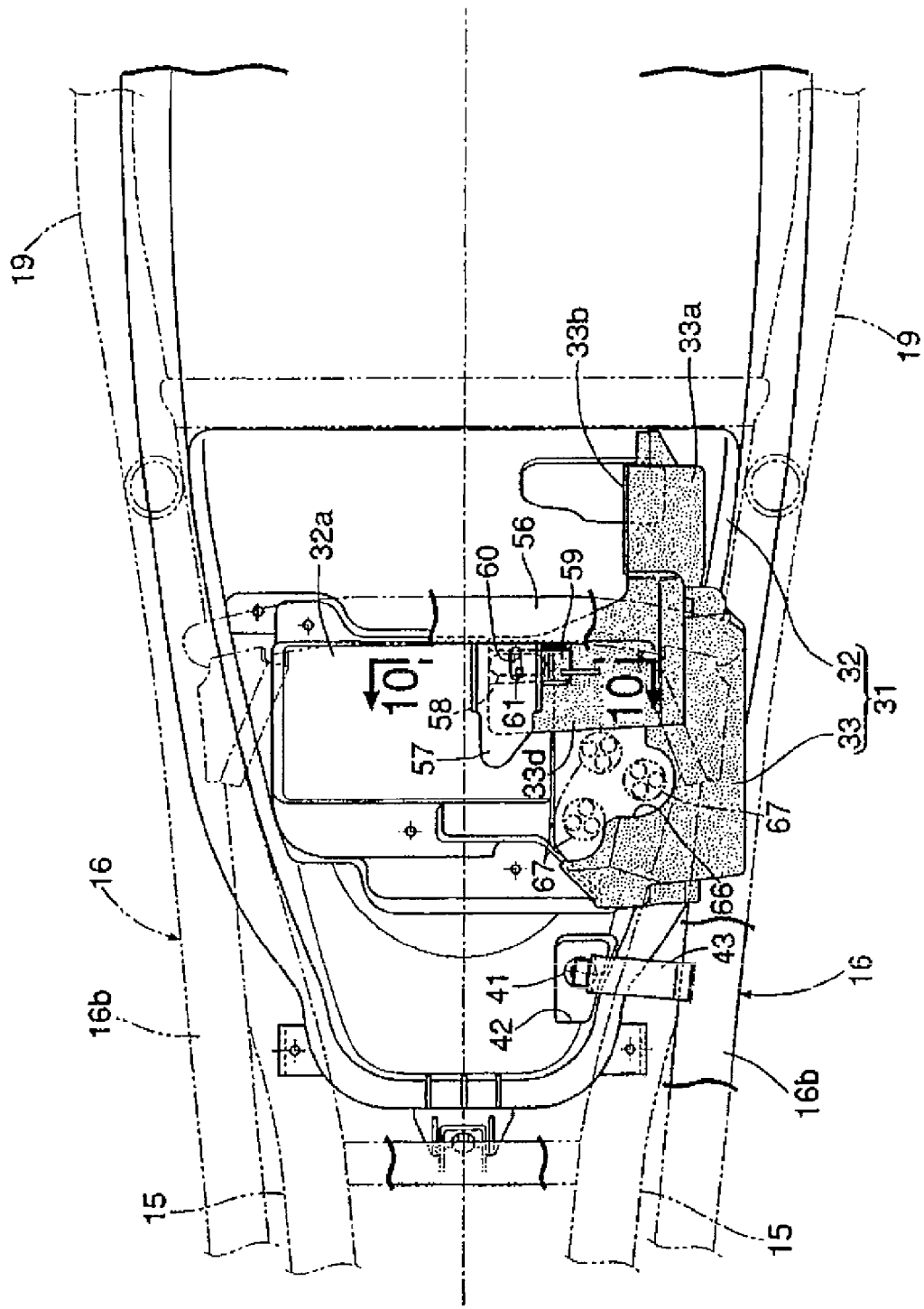
FIG. 6 is a bottom view seen from the direction of an arrow 6 in FIG. 3.

As clearly shown in FIGS. 5 and 6, a cutout portion 66 is formed at the lower part of the box constituent member 33. Electric wires 67, drawn to the outside from the battery 36 and the fuse box 37 in the electronic component storage chamber 35, are nipped between the cutout portion 66 and the lower part of the box main body 32.

A first cross member 52 that constitutes a part of the body frame F is provided at the front of the storage box 31 and between both upper down frames 15. A mounting plate portion 54 mounted to the front part of the box main body 32 is fastened to a stay 53 disposed to the first cross member 52. Mounting plate portions 55 mounted at both right and left sides at the front part of the box main body 32 are fastened to the right and left seat rails 17.

A second cross member 56 serving as a support frame that constitutes a part of the body frame F is provided below the hanging portion 32a of the box main body 32 and between both of the horizontal portions 16b in the lower down frames 16. The hanging portion 32a and the box constituent member 33 are supported by the second cross member 56.

Figure 10:
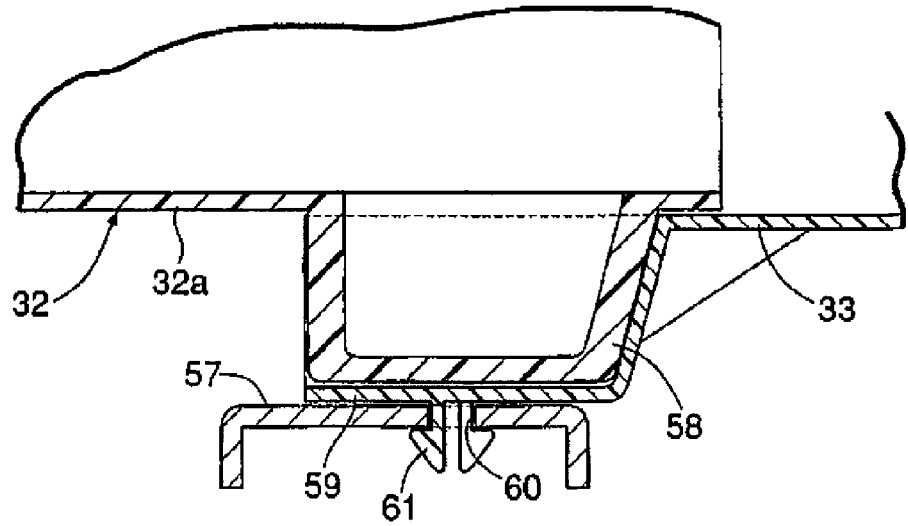
FIG. 10 is an enlarged sectional view taken long a line 10-10 in FIG. 6.

In FIG. 10, a first leg portion 58 extending toward a stay 57 that is mounted to the second cross member 56 is provided at the bottom part of the hanging portion 32a of the box main body 32. The first leg portion 58 is formed to have a cross-section of an elliptic shape that is long in the lateral direction of the motorcycle. On the other hand, a second leg portion 59 extending toward the stay 57 of the second cross member 56 is provided at the bottom part of the box constituent member 33 so as to store the first leg portion 58. The second leg portion 59 is formed into a shape open to the left side of the motorcycle.

An engagement portion 61, which is resiliently engaged with a support hole 60 formed to the stay 57 of the second cross member 56, is provided at the lower end of the second leg portion 59. The engagement portion 61 is resiliently engaged with the support hole 60 for placing the second leg portion 59 on the stay 57, whereby the second leg portion 59 is placed and fixed on the stay 57 of the second cross member 56.

Upon assembling the storage box 31 to the body frame F, the following steps are successively performed, a step of fixing the box constituent member 33 to the body frame F, a step of mounting the box constituent member 33 from the side to the box main body 32 that is arranged among the rear portions of the pair of right and left upper down frames 15, the pair of right and left seat rails 17, and the pair of right and left rear frames 20, so as to assemble the storage box 31 and a step of mounting the box main body 32 of the storage box 31 after the assembly to the body frame F. When the step of mounting the box constituent member 33 to the box main body 32 is performed, the electric wires 67 connected to the battery 36 and the fuse box 37, which should be stored in the electronic component storage chamber 35, are inserted into the cutout portion 66 of the box constituent member 33, and with this state, the electric wires 67 are nipped between the cutout portion 66 and the box main body 32.

Next, the operation of this embodiment will be explained. The storage box 31 is composed of the box main body 32 arranged among the pair of right and left upper down frames 15, the pair of right and left seat rails 17, and the pair of right and left rear frame 19, and the box constituent member 33 that is detachably mounted to the box main body 32 so as to constitute a part of the wall portion of the storage box 31. As viewed from a plane with the box constituent member 33 mounted to the box main body 32, the box constituent member 33 is formed to be overlapped with the right upper down frame 15 and the right seat rail 17, which are at least a part of the upper down frames 15, seat rails 17, and the rear frames 19 that are at both sides of the box main body 32, and to be bulged from the box main body 32. Accordingly, the degree of freedom of the whole shape of the storage box 31 can be increased, and further, the storage capacity can be increased, regardless of the shape of the body frame F.

Further, the box constituent member 33 is mounted below the box main body 32 so as to form the electronic component storage chamber 35 in cooperation with the hanging portion 32a of the box main body 32. Therefore, the storage capacity can be increased without increasing the width of the opening at the end of the upper opening of the storage box 31. Accordingly, it is unnecessary to widen the width of the riding seat 21 above the storage box 31, whereby foot grounding property of a rider seated on the riding seat 21 is not deteriorated.

The box constituent member 33 is mounted below the box main body 32 from one direction of the lateral direction (from the right side in the present embodiment) of the motorcycle, and the battery 36 and the fuse box 37 are stored in the electronic component storage chamber 35 side by side in the lateral direction. Therefore, this configuration makes it possible to store the battery 36 and the fuse box 37 in the electronic component storage chamber 35 side by side without limiting the width of the electronic component storage chamber 35 by the pair of right and left upper down frames 15 and the pair of right and left seat rails 17. Therefore, it becomes unnecessary to secure a free space between the pair of right and left upper down frames 15 and the pair of right and left seat rails 17 in the longitudinal direction, whereby the degree of freedom of layout can be increased.

The riding seat 21 is pivotably journalled to the storage box 31 through the hinge 40, and the opening 42 through which the damper rod 41, formed between the body frame F and the front seat 21a of the riding seat 21 penetrates, is formed to the box main body 32 at a position apart from the electronic component storage chamber 35. Therefore, compared to the case in which the damper rod 41 is arranged in the electronic component storage chamber 35, the influence given to the storage capacity of the electronic component storage chamber 35 by the damper rod 41 can be prevented.

Since the protrusion portion 33a that protrudes to the side from the mounting portion of the box constituent member 33 to the box main body 32 is provided to the box constituent member 33, and the cover portion 33b that forms the small storage chamber 45 between the protrusion portion 33a and the cover portion 33b is integrally mounted to the protrusion portion 33a as being openable and closable, only the box constituent member 33 can form the small storage chamber 45. Therefore, the storage capacity can be increased, and the degree of freedom of the whole shape of the storage box 31 can be enhanced without increasing the number of components.

The first leg portion 58, which extends toward the second cross member 56 comprising a part of the body frame F and arranged below the storage box 31, is provided at the bottom part of the box main body 32, and the second leg portion 59, which stores the first leg portion 58 and extends toward the second cross member 56, is provided at the bottom part of the box constituent member 33. Further, the second leg portion 59 is placed and fixed on the stay 57 of the second cross member 56. Therefore, the box main body 32 and the box constituent member 33 are supported by the second cross member 56 at the same position, whereby the number of components can be reduced compared to the case in which the box main body 32 and the box constituent member 33 are supported at the positions apart from each other.

When the storage box 31 is assembled and mounted to the body frame F, the step of fixing the box constituent member 33 to the body frame F, the step of mounting the box constituent member 33 to the box main body 32, which is arranged among the rear portions of the pair of right and left upper down frames 15, the pair of the right and left seat rails 17, and the pair of right and left rear frames 20, from the side so as to assemble the storage box 31, and the step of mounting the box main body 32 of the storage box 31 after the assembly to the body frame F are successively carried out. Therefore, the box constituent member 33 can be mounted to the box main body 32 so as to form the storage box 31, regardless of whether the box constituent member 33 is overlapped with the pair of right and left upper down frames 15 and the pair of right and left seat rails 17 viewed in a plane, as well as the storage box 31 can be mounted to the body frame F. Accordingly, the assembling workability can be enhanced.

The cutout portion 66 is formed to the box constituent member 33, and when the step of mounting the box constituent member 33 to the box main body 32 is executed, the constituent member 33 is mounted to the box main body 32 in such a manner that the electric wires 67 connected to the battery 36 and the fuse box 37 that should be housed in the electronic component storage chamber 35 are inserted to the cutout portion 66 of the box constituent member 33. In this state, the electric wires 67 are nipped between the cutout portion 66 and the box main body 32. Accordingly, the operation for drawing the electric wires 67 from the storage box 31 is facilitated, and the degree of freedom of the arrangement layout of the electric wires 67 can be enhanced as compared to the case in which an open hole through which the electric wires 67 are inserted is formed with respect to either one of the box main body 32 and the box constituent member 33.

The present invention has been described above. The present invention is not limited to the above-mentioned embodiment. Various modifications are possible without departing from the scope of the present invention.

For example, in the above-mentioned embodiment, most portions of the storage box except for the box constituent member are arranged between the pair of right and left frame members. However, most portions of the storage box except for the box constituent member are arranged between a pair of front and rear frame members.

In the above-mentioned embodiment, the box constituent member 33 is mounted to the box main body 32 after the box constituent member 33 is fixed to the body frame F. However, the box constituent member 33 can be mounted to the box main body 32 after the box main body 32 is fixed to the body frame F.

Figure 11:
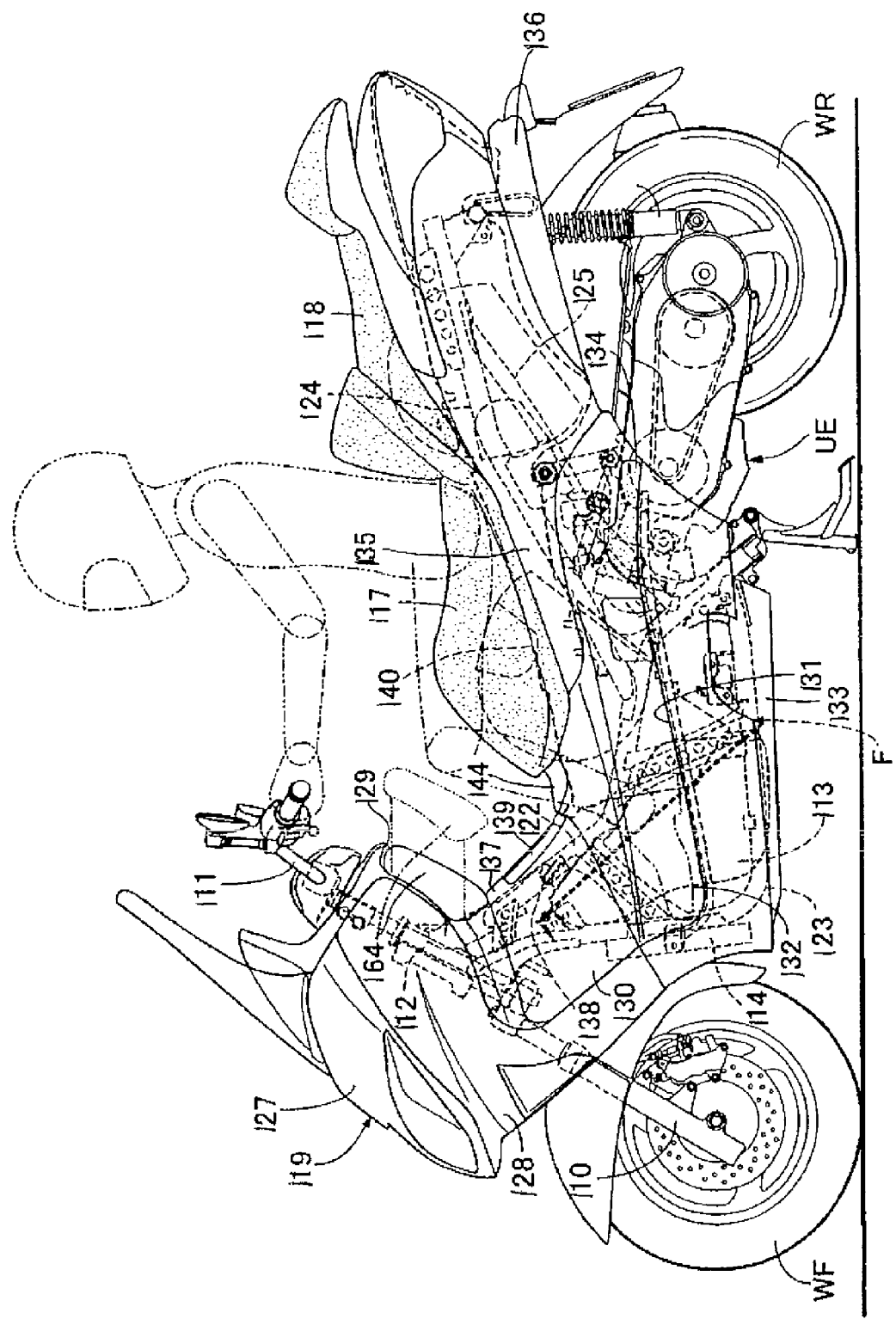
FIG. 11 is a left side view of a scooter-type motorcycle.

As illustrated in FIG. 11, a vehicle body frame F of the scooter-type motorcycle includes, at a frond end thereof, a front fork 110 journaling a front wheel WF and a head pipe 112 steerably and movably supporting a steering handlebar 111 coupled to the front fork 110. A unit swing engine UE with the rear end thereof supporting a rear wheel WR is movably supported at the middle part in the front-rear direction of the vehicle body frame F in such a manner as to be capable of swinging up and down. Loaded at the vehicle body frame F forward of the unit swing engine UE are a fuel tank 113 as a functional component formed vertically long as viewed from the side and a radiator 114 arranged forward of the fuel tank 113. Moreover, arranged at the rear of the vehicle body frame F are an occupant seat 117 and a passenger seat 118 arranged behind the occupant seat 117. Further, attached to the vehicle body frame F is a vehicle body cover 119 of synthetic resin that covers the vehicle body frame F, the front part of the unit swing engine UE, the fuel tank 113, and the radiator 114.

The vehicle body frame F includes the head pipe 112, a pair of left and right upper down frames 122, installed consecutively to the head pipe 112 and extending downward and rearward, a pair of left and right lower down frames 123 each formed of a front half part provided below the upper down frame 122 consecutively to the head pipe 112 and extending downwardly and rearwardly and a rear half part extending horizontally rearward, both of which parts are provided integrally and consecutively to each other, with the rear ends of the lower down frames 123 respectively welded to the rear end parts of the upper down frames 122. A pair of left and right seat rails 124 respectively extend upward in the rearward direction from the middle parts of the both upper down frames 122. A pair of left and right rear frames 125 couple between the rear parts of the upper down frames 122 and rear parts of the seat rails 124.

The vehicle body cover 119 includes a front cover 127 covering a front part of the head pipe 112 and a top part of the front wheel WF, a pair of left and right front side covers 128 respectively joined to both the left and right sides of the front cover 127 and an inner cover 129 continuing to the front side covers 128 in such a manner so as to cover the head pipe 112 from the rear side. A leg shield 30 is joined to both front side covers 128 and the inner cover 129 in such a manner so as to cover the front of leg parts of a rider on the occupant seat 117. A pair of left and right floor center covers 132 backwardly extend continuously to the leg shield 130 and also form at the lower end part thereof foot rest parts 131 where an occupant places his or her feet. A pair of left and right floor side covers 133 is respectively downwardly suspended from outer edges of the foot rest parts 131 with a pair of left and right passenger steps 134 respectively provided at the rear of the foot rest parts 131. A pair of left and right body side covers 135 is respectively arranged below both sides of the occupant seat 117 and the passenger seat 118 and is also provided consecutively to the floor side covers 133 and extends rearwardly. A rear lower cover 136 is provided consecutively below the rear side of the body side cover 135.

With part of the leg shields 130 and the floor center covers 132, a floor tunnel part 137 upwardly projects between both foot rest parts 131 and also storing the fuel tank 113 and the radiator 114 that are formed from behind the head pipe 112 toward below the front end of the occupant seat 117. At this floor tunnel part 137, an oil-feed lid 139 is openably and closably disposed for permitting an oil-feed cap 138 included at the top end of the fuel tank 113 to be opened for oil supply to the fuel tank 113. At the rear of both upper down frames 122 in the vehicle body frame F and between both seat rails 124 and both rear frames 125 below the occupant seat 117 and the passenger seat 118, a storage box 140 is arranged which permits storage and take-out of goods while the occupant seat 117 and the passenger seat 118 are open.

Figure 12:
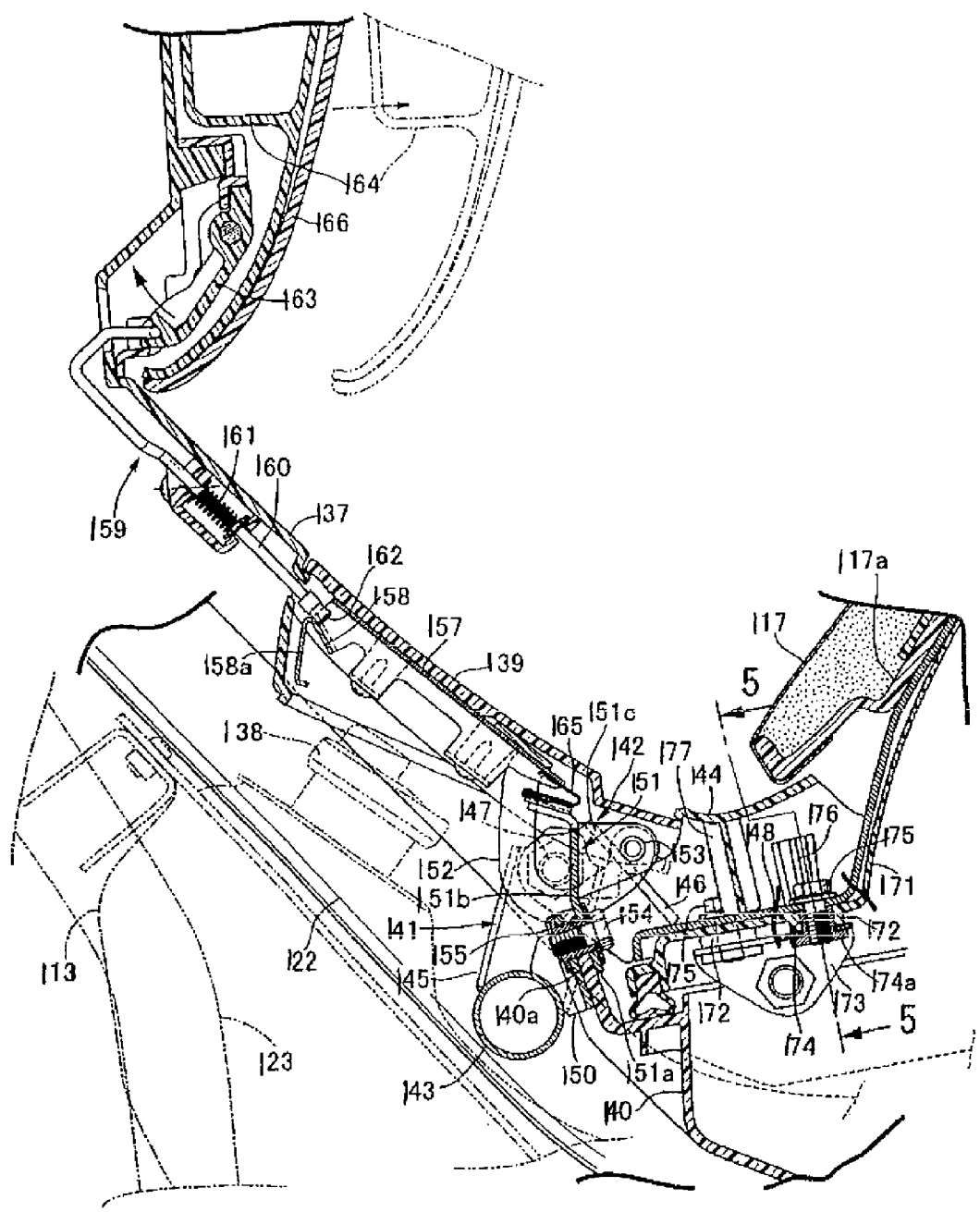
FIG. 12 is an enlarged longitudinal sectional view of the surrounding of the front of an occupant seat.
Figure 13:
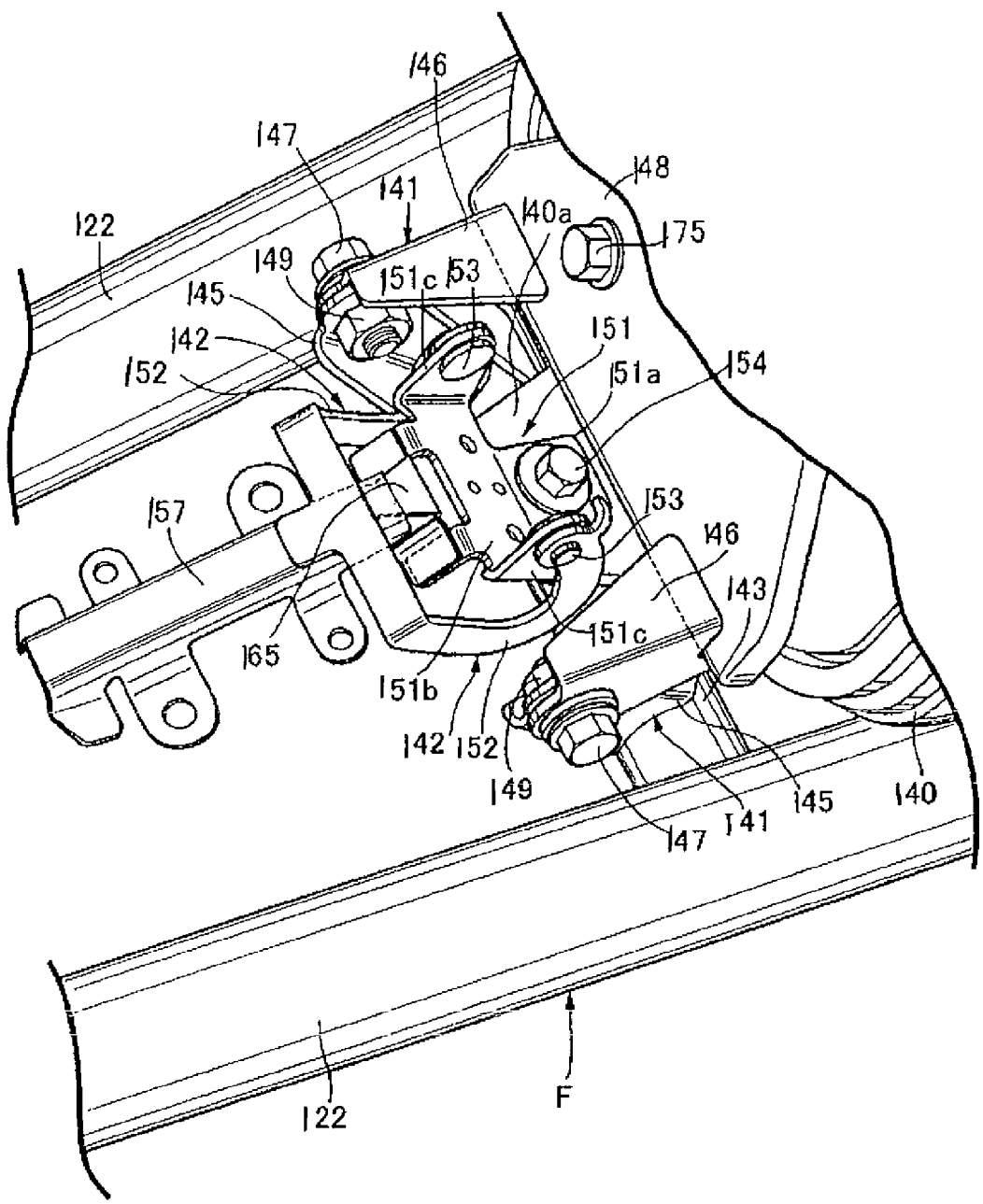
FIG. 13 is a perspective view of a seat hinge mechanism and an oil-feed lid hinge mechanism.
Figure 14:
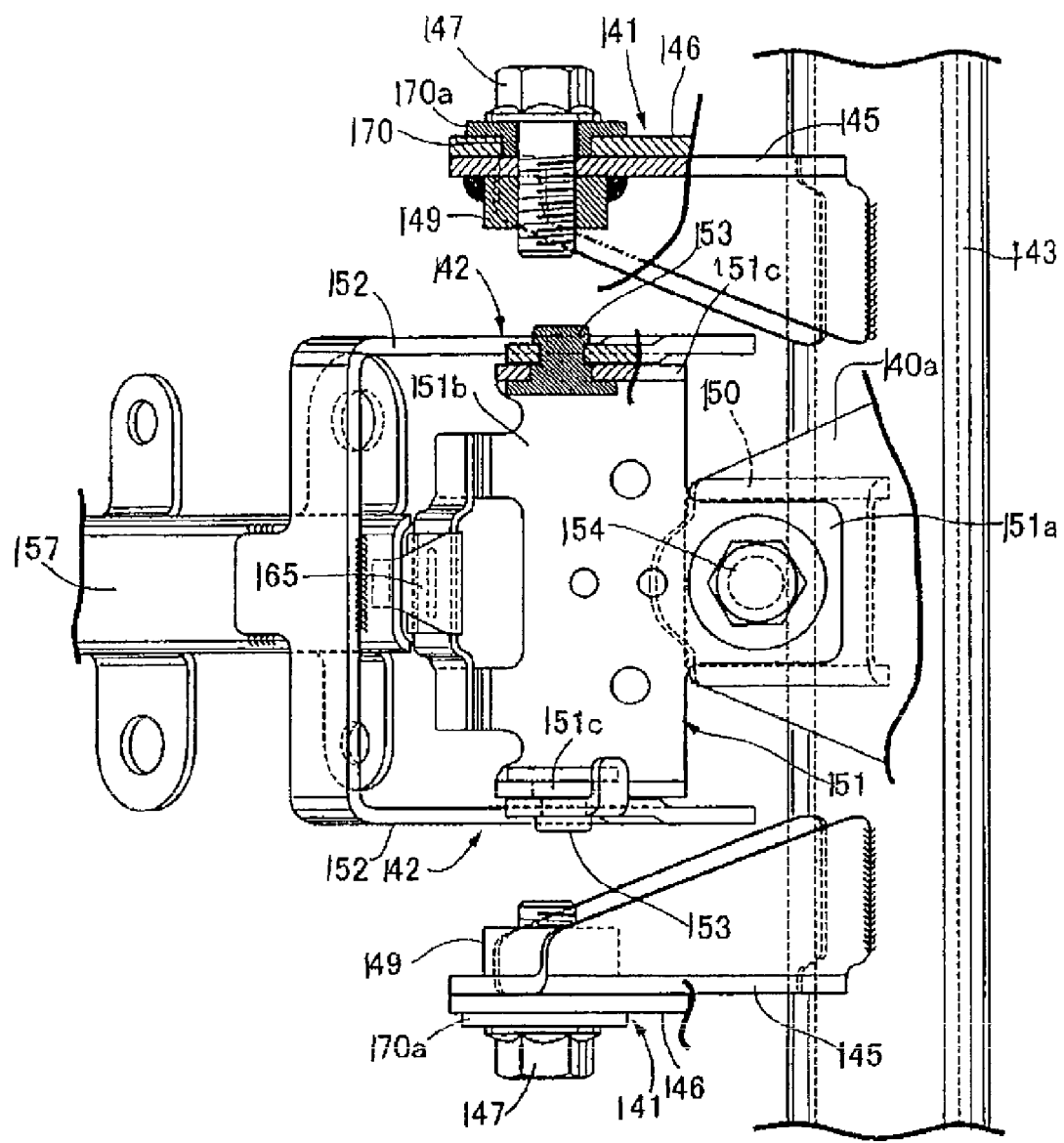
FIG. 14 is a plan view of the seat hinge mechanism and the oil-feed hinge mechanism.
Figure 15:
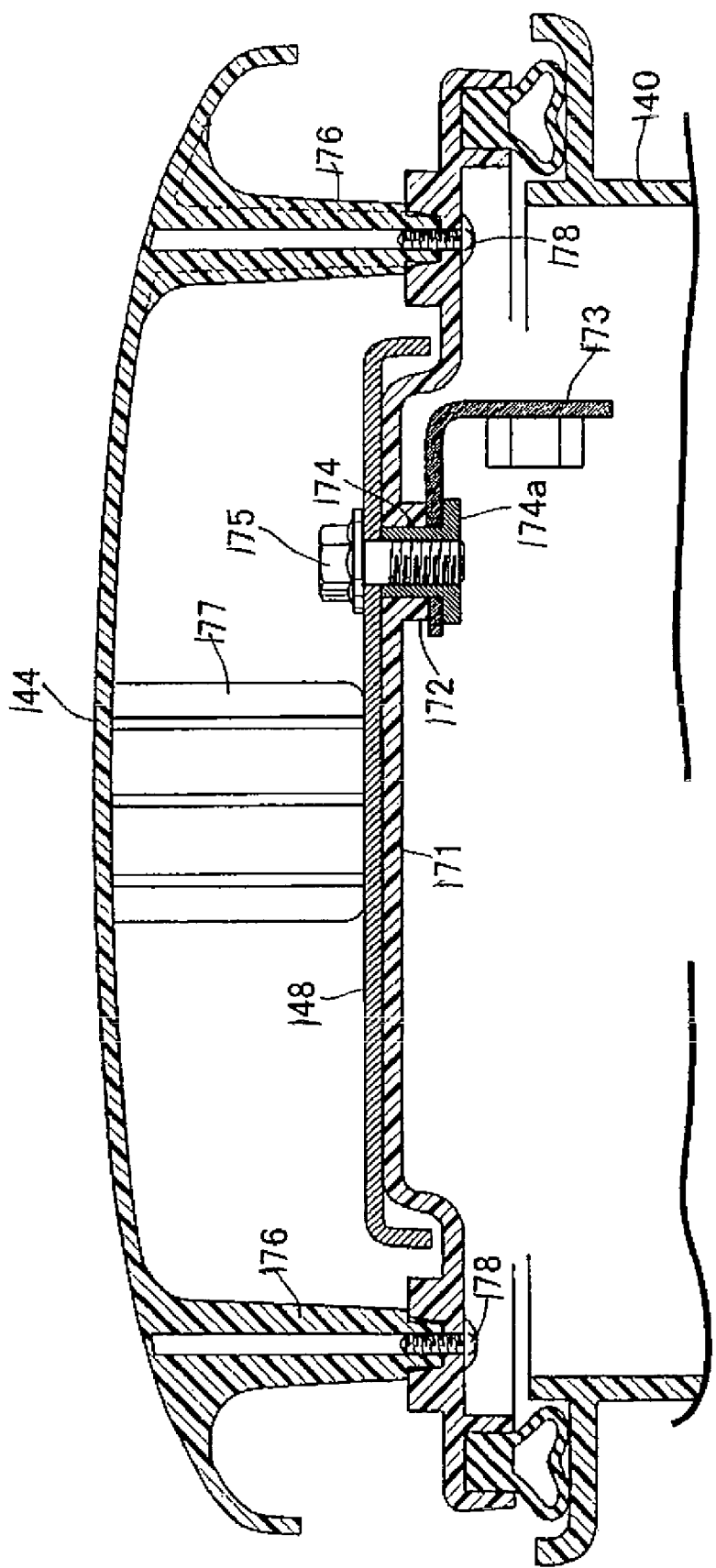
FIG. 15 is an enlarged sectional view taken along a line 5-5 of FIG. 2.

Referring to FIGS. 12 to 14, the occupant seat 117 is arranged on the storage box 140 in such a manner so as to cover a front opening part of the storage box 140 from above. Between both left and right sides of the front end part of the occupant seat 117 and the vehicle body frame F, a pair of seat hinge mechanisms 141 is provided which turnably supports the occupant seat 117. On the inner side of the seat hinge mechanisms 141 between the rear end part of the oil-feed lid 139 and the vehicle body frame F, a pair of left and right oil-feed lid hinge mechanisms 142 is provided which supports the oil-feed lid 139 while permitting the oil-feed lid 139 to turn around an axis line parallel to a turning axis line of the occupant seat 117.

The vehicle body frame F includes a cross pipe 143 arranged at the front of the storage box 140 and above the fuel tank 113 and also coupling together middle parts of the pair of left and right upper down frames 122. Between this cross pipe 143 and the occupant seat 117, the seat hinge mechanisms 141 are provided. Between the cross pipe 143 an Ad the oil-feed lid 139, the oil-feed lid hinge mechanisms 142 are provided. The seat hinge mechanisms 141 and the oil-feed lid hinge mechanisms 142 are covered by a hinge cover 144.

The seat hinge mechanism 141 is formed of a seat bracket 145 fixed to the cross pipe 143 of the vehicle body frame F and a seat arm 146 provided at the occupant seat 117, which are turnably coupled together via a bolt 147 that permits the operation of fastening and releasing the fastening from the outer side along the width direction of the vehicle body frame F. The seat brackets 145 of the both seat hinge mechanisms 141 are respectively fixed to both end parts of the cross pipe 143 through welding or otherwise.

To a bottom plate 117a of the occupant seat 117, a support plate 148 is fixed which extends forward of the occupant seat 117. To the both left and right sides of this support plate 148, the seat arms 146 are respectively fixed through welding or otherwise. Accordingly, the seat arms 146 are arranged on the outer side of the seat brackets 145. Cylindrical collars 170 respectively having at the outer ends thereof collar parts 170a respectively abutting on the outer side surfaces of the seat arms 146 are respectively inserted through the seat arms 146. The bolts 147 respectively inserted through the collars 170 and the seat brackets 145 from the outer side along the width direction of the vehicle body frame F are respectively screwed into weld nuts 149 respectively fixed to the inner side surfaces of the seat brackets 145.

The oil-feed lid hinge mechanism 142 is formed of a lid bracket 151 fastened to a stay 150 fixed to a central part of the cross pipe 143 at the vehicle body frame F with a lid arm 152 provided at the oil-feed lid 139, both of which are turnably coupled together via a pin 153 having an axis line parallel to the bolts 147.

The lid bracket 151 is a single component shared by the pair of left and right oil-feed lid hinge mechanisms 142. This lid bracket 151 and an attaching plate part 140a provided at the front end part of the storage box 140 and extending forward are arranged between both seat hinge mechanisms 141. The lid bracket 151 and the attaching plate part 140a are fastened to the stay 150 of the vehicle body frame F through co-fastening by a bolt 154 and a nut 155 each as a single fastening member capable of fastening in a direction orthogonal to the turning axis lines of the both oil-feed lid hinge mechanisms 142 and the both seat hinge mechanisms 141.

Accordingly, the lid bracket 151 integrally has a fastened plate part 151a that is so tilted as to face diagonally upwardly and rearwardly. A rising plate part 151b rises upwardly from the fastened plate part 151a with a pair of support plate parts 151c respectively provided consecutively to both sides of the rising plate part 51b. On the attaching plate part 140a that is tilted so as to face diagonally upwardly and rearwardly in a manner similar to the fastened plate part 151a and placed on the stay 150 from above, the fastened plate part 151a is superimposed from above. Then into the nut 155 inserted through the stay 150 and the attaching plate part 140a, the bolt 154 is screwed.

The rear surface of the oil-feed lid 139 is fastened at a plurality of regions to a frame member 157 extending in the front-rear direction of the vehicle body. To the rear end of this frame member 157, the pair of left and right lid arms 152 is fixed through welding or otherwise. The lid arms 152 are respectively turnably coupled to the both support plate parts 151c of the lid bracket 151 via the pins 153.

Referring to FIGS. 11-15, the lower surface of the support plate 138 abuts with an under cover 171 of synthetic resin having a portion protruding laterally from both sides of the support plate 148. From the lower surface of this under cover 171, a pair of cylindrical boss parts 172 project at the front and rear with a space provided therebetween. Provided between the occupant seat 117 and the vehicle body frame F is a bumper (not shown) for making a gentle turning movement of the occupant seat 117 for the purpose of opening and closing the storage box 140. A bumper bracket 173 for coupling the upper end of this bumper abuts on the lower ends of the both boss parts 172. Accordingly, cylindrical nuts 174 respectively integrally having collar parts 174a abutting on the bumper bracket 173 from below are inserted through the bumper bracket 173 and the boss parts 172, and bolts 175 inserted through the support plate 148 from above are screwed into the nuts 174. Consequently, the bumper bracket 173 is fastened to the support plate 148 by the bolts 175 in such a manner so as to sandwich the under cover 171 with the support plate 148.

On the rear surface of the hinge cover 44 covering the seat hinge mechanisms 141 and the oil-feed lid hinge mechanisms 142, a pair of support legs 176 are provided that include lower end parts that abut on the under cover 171 on both sides of the support plate 148. The pair of support legs 176 is integrally provided with a space provided therebetween in the horizontal direction. In addition, an abutting support leg 177 is integrally provided which makes its lower end abutting on the support plate 148 in front of the central part between the both support legs 176. Screw members 178, inserted through the under cover 171 from below, are respectively screwed into both support legs 176. Accordingly, the abutting support leg 177 fulfills the function of preventing forward falling of the hinge cover 144 while being supported at and fixed to the under cover 171 with the both support legs 176.

As illustrated in FIG. 12, at the front end part of the frame member 157, an engaging part 158 is provided. A lid lock mechanism 159 for locking the closed state of the oil-feed lid 139 engages with the engaging part 158, thereby holding the oil-feed lid 139 in a locked state.

The lid lock mechanism 159 includes a rod 160 extending forward of the oil-feed lid 139 and below the floor tunnel part 137 in the front-rear direction of the vehicle body with a spring 161 biasing the rod 160 rearwardly along the front-rear direction of the vehicle body. To the rear end of the rod 160, a cap 162 of synthetic resin is fitted which is capable of engaging with the engaging part 158.

To the rod 160, through operation by a lock releasing operation member 163, a force acts in a direction that releases the engagement between the cap 162 and the engaging part 158 against a spring force of the spring 161, that is, in the forward direction. On the other hand, in the inner cover 129, a front part storage box 164 fitted with a decorative cover 166 is drawably disposed. The lock release operation member 163 is disposed in the inner cover 129 in such a manner as to be covered by the front part storage box 164 when the front part storage box 164 is fitted to the inner cover 129. Under the condition that the front part storage box 164 is drawn from the inner cover 129 and separated therefrom as is shown by a chain line of FIG. 12, operating the lock release operation member 163 to turn in a direction indicated by an arrow can release the engagement between the cap 162 and the engaging part 158 to thereby operate the oil-feed lid 139 to open.

To close the oil-feed lid 139 in an open state, it is required to press the rod 160 of the lid lock mechanism 159 forward. To the engaging part 158 on the oil-feed lid 139 side, a pressing plate part 158a for pressing the cap 162 at the rear end of the rod 160 forward in accordance with closing operation of the oil-feed lid 139 is provided integrally and consecutively. When the oil-feed lid 139 is closed from an open state, the pressing plate part 158a presses the rod 160 forward via the cap 162, and when the oil-feed lid 139 turns to the closed position, the rod 160 is moved rearward by the spring force of the spring 161, and the cap 162 engages with the engaging part 158, whereby the closed state of the oil-feed lid 139 is locked.

On the rear end of the frame member 157 to which the oil-feed lid 139 is fastened, a plate spring 165, fixed to the upper end of the rising plate part 151b in the lid bracket 151, abuts while the oil-feed lid 139 is in the closed state. When the state of the oil-feed lid 139 being locked by the lid lock mechanism 159 is released, the oil-feed lid 139 is spring-biased toward the opening side by the spring force exerted by the plate spring 165.

Next, the operation of this embodiment will be described. Between both left and right sides of the front end part of the occupant seat 117 and the vehicle body frame F, the pair of seat hinge mechanisms 141 is provided which turnably supports the occupant seat 117. On the inner side of the seat hinge mechanisms 141 between the rear end part of the oil-feed lid 139 and the vehicle body frame F, the pair of left and right oil-feed lid hinge mechanisms 142 is provided which supports the oil-feed lid 139 while permitting the oil-feed lid 139 to turn around the axis line parallel to the turning axis line of the occupant seat 117. The lid bracket 151 forms part of both oil-feed lid hinge mechanisms 142 and is also shared by the both oil-feed lid hinge mechanisms 142 and the attaching plate part 140a provided at the front end part of the storage box 140 that is arranged between the pair of left and right seat hinge mechanisms 141 and also fastened to the vehicle body frame F.

Therefore, the seat hinge mechanisms 141, the lid hinge mechanisms 142, and the front end part of the storage box 140 can be arranged as proximally as possible while avoiding their mutual interference without influencing the vehicle body lay out, and while increasing the degree of freedom of the vehicle body frame layout, the front end part of the storage box 140 can extend forward to thereby achieve an increase in the capacity of the storage box 140.

Moreover, the lid bracket 151 and the attaching plate part 140a at the front end part of the storage box 140 are fastened together to the vehicle body frame F, which can reduce the number of components.

Moreover, the attaching plate part 140a at the front end part of the storage box 140 and the lid bracket 151 are fastened together to the vehicle body frame F with the bolt 154 and the nut 155 each as a single component capable of fastening them in a direction orthogonal to the turning axis lines of the both oil-feed lid hinge mechanisms 142 and both seat hinge mechanisms 141. Thus, the storage box 140 and the oil-feed lid hinge mechanisms 142 can be attached to the vehicle body frame F with a small number of components.

The lid bracket 151 integrally includes the fastened plate part 151a that is tilted so as to face diagonally upwardly and rearwardly. The rising plate part 151b rises upwardly from the fastened plate part 151a with the support plate parts 151c respectively provided consecutively to the both sides of the rising plate part 151b in such a manner so as to turnably support the respective lid arms 152 separately included in both oil-feed lid hinge mechanisms 142 and fixed to the oil-feed lid 39. The fastened plate part 151a is fastened together with the attaching plate part 140a to the vehicle body frame F. This therefore makes it easy to operate the bolt 154 that fastens the fastened plate part 151a and the attaching plate part 140a to the vehicle body frame F, which improves the operability in attaching and removing the lid bracket 151 in the oil-feed lid hinge mechanisms 142 and the attaching plate part 140a of the storage box 140 to and from the vehicle body frame F.

On the stay 150 provided at the vehicle body frame F, the attaching plate part 140a at the front end part of the storage box 140 is placed from above, and the fastened plate part 151a of the lid bracket 151, superimposed on the attaching plate part 140a from above and the attaching plate part 140a, are fastened to the stay 150. Therefore, after the storage box 140 that is larger in size than the oil-feed lid 139 is fixed to the vehicle body frame F, the oil-feed lid 139 that is smaller in size than the storage box 140 can be attached to the vehicle body frame F while being held, which permits achieving an improvement in the efficiency of operability in assembly and disassembly such as maintenance.

Further, the seat hinge mechanism 141 is formed of the seat bracket 145 fixed to the vehicle body frame F and the seat arm 146 provided at the occupant seat 117, both of which are turnably coupled together via the bolt 147 that permits a fastening and a fastening release operation from outside along the width direction of the vehicle body frame F. Thus, the seat hinge mechanisms 141 can be easily disassembled and then maintenance on the lid hinge mechanisms 142 arranged between both seat hinge mechanisms 141 can be easily performed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A storage box structure for a motorcycle, comprising:
a body frame having at least a pair of right and left or front and rear frame members;
a storage box that opens upwardly among the pair of frame members; and
a riding seat that covers the opening end of the storage box from above;
wherein the storage box includes a box main body arranged among the pairs of frame members and a box constituent member that is detachably mounted below the box main body so as to compose a part of the wall portion of the storage box and to form an electronic component storage chamber in cooperation with the box main body; and
the box constituent member is formed to be overlapped with at least a part of the frame members of at least a pair of frame members viewed in a plane with the box constituent member mounted to the box main body, and further to bulge from the box main body.

2. The storage box structure according to claim 1, wherein the box constituent member is mounted below the box main body, which is arranged among the pair of right and left frame members, from one direction of a lateral direction of the motorcycle; and a battery and an electronic component box storing an electronic component are stored in the electronic component storage chamber as arranged side by side in the lateral direction.

3. The storage box structure according to claim 2, wherein the box constituent member is provided with a cutout portion that nips an electric wire, which is drawn from the electronic component storage chamber to the outside, between the box main body and the cutout portion.

4. The storage box structure according to claim 3, wherein the riding seat is pivotably journalled to the storage box through a hinge; and an opening through which a damper rod, which is provided between the body frame and the riding seat, penetrates is formed to the box main body at the position apart from the electronic component storage chamber.

5. The storage box structure according to claim 1, wherein a protrusion portion, which protrudes to the side from a mounting portion of the box constituent member to the box main body, is provided to the box constituent member; and a cover portion that forms a small storage chamber between the protrusion portion and the cover portion is integrally formed with the protrusion portion so as to be openable and closable.

6. The storage box structure according to claim 2, wherein a protrusion portion, which protrudes to the side from a mounting portion of the box constituent member to the box main body, is provided to the box constituent member; and a cover portion that forms a small storage chamber between the protrusion portion and the cover portion is integrally formed with the protrusion portion so as to be openable and closable.

7. The storage box structure according to claim 3, wherein a protrusion portion, which protrudes to the side from a mounting portion of the box constituent member to the box main body, is provided to the box constituent member; and a cover portion that forms a small storage chamber between the protrusion portion and the cover portion is integrally formed with the protrusion portion so as to be openable and closable.

8. The storage box structure according to claim 4, wherein a protrusion portion, which protrudes to the side from a mounting portion of the box constituent member to the box main body, is provided to the box constituent member; and a cover portion that forms a small storage chamber between the protrusion portion and the cover portion is integrally formed with the protrusion portion so as to be openable and closable.

9. The storage box structure according to claim 1, wherein a first leg portion that extends toward a support frame, which composes a part of the body frame and arranged below the storage box, is provided at the bottom part of the box main body;

a second leg portion that stores the first leg portion and extends toward the support frame is provided at the bottom part of the box constituent member; and the second leg portion is placed and fixed on the support frame.

10. The storage box structure according to claim 2, wherein a first leg portion that extends toward a support frame, which composes a part of the body frame and arranged below the storage box, is provided at the bottom part of the box main body;

a second leg portion that stores the first leg portion and extends toward the support frame is provided at the bottom part of the box constituent member; and the second leg portion is placed and fixed on the support frame.

11. The storage box structure according to claim 3, wherein a first leg portion that extends toward a support frame, which composes a part of the body frame and arranged below the storage box, is provided at the bottom part of the box main body;

a second leg portion that stores the first leg portion and extends toward the support frame is provided at the bottom part of the box constituent member; and the second leg portion is placed and fixed on the support frame.

12. The storage box structure according to claim 4, wherein a first leg portion that extends toward a support frame, which composes a part of the body frame and arranged below the storage box, is provided at the bottom part of the box main body;

a second leg portion that stores the first leg portion and extends toward the support frame is provided at the bottom part of the box constituent member; and the second leg portion is placed and fixed on the support frame.

13. The storage box structure according to claim 5, wherein a first leg portion that extends toward a support frame, which composes a part of the body frame and arranged below the storage box, is provided at the bottom part of the box main body;

a second leg portion that stores the first leg portion and extends toward the support frame is provided at the bottom part of the box constituent member; and the second leg portion is placed and fixed on the support frame.

14. A method of mounting a storage box for assembling the storage box and mounting the storage box to a body frame, comprising:

fixing the box constituent member to the body frame;

mounting the box constituent member to the box main body that is arranged among at least a pair of frame members so as to assemble the storage box; and mounting the box main body of the assembled storage box to the body frame, wherein these steps are successively performed, wherein a cutout portion is formed to the box constituent member; and when the step of mounting the box constituent member that is mounted to the body frame to the box main body is executed, the box constituent member is mounted to the box main body in such a manner that an electric wire connected to an electronic component that should be stored in the electronic component storage chamber is inserted into the cutout portion, and the electric wire is nipped between the cutout portion and the box main body.

15. A motorcycle comprising:

a storage box arranged below an openable and closable occupant seat, the storage box permitting storage and take-out of goods while the occupant seat is open;

a fuel tank stored in a floor tunnel part which is arranged between a pair of left and right foot rest parts where an occupant places his or her feet and which projects upwardly; and an oil-feed lid being openably and closably disposed at the floor tunnel part, the oil-feed lid covering an oil-feed cap openably and closably attached to a top part of the fuel tank;

wherein a pair of seat hinge mechanisms turnably supporting the occupant seat are provided between both left and right sides of a front end part of the occupant seat and a vehicle body frame;

a pair of left and right oil-feed lid hinge mechanisms supporting the oil-feed lid while permitting the oil-feed lid to turn around an axis line parallel to a turning axis line of the occupant seat is provided on the inner side of the seat hinge mechanisms between the rear end part of the oil-feed lid and the vehicle body frame; and a lid bracket forming part of both the oil-feed lid hinge mechanisms and also shared by both the oil-feed lid hinge mechanisms and an attaching plate part provided at a front end part of the storage box are arranged between the pair of left and right seat hinge mechanisms and also fastened together to the vehicle body frame.

16. The motorcycle according to claim 15, wherein the seat hinge mechanism is formed of a seat bracket fixed to the vehicle body frame and a seat arm provided at the occupant seat, both of which are turnably coupled together via a bolt that permits a fastening and a fastening release operation from outside along a width direction of the vehicle body frame.

17. The motorcycle according to claim 15, wherein the attaching plate part at the front end part of the storage box and the lid bracket are fastened together to the vehicle body frame with a single fastening member capable of fastening in a direction orthogonal to turning axis lines of both oil-feed lid hinge mechanisms and both seat hinge mechanisms.

18. The motorcycle according to claim 15, wherein the lid bracket integrally has a fastened plate part tilted so as to face diagonally upward and rearward;

a rising plate part rising upwardly from the fastened plate part; and support plate parts respectively provided consecutively to both sides of the rising plate part in such a manner as to turnably support respective lid arms separately included in both oil-feed lid hinge mechanisms and fixed to the oil-feed lid; and the fastened plate part is fastened together with the attaching plate part to the vehicle body frame.

19. The motorcycle according to claim 15, wherein the attaching plate part at the front end part of the storage box is placed from above on a stay provided at the vehicle body frame; and the lid bracket superimposed on the attaching plate part from above and the attaching plate part are fastened to the stay.

* * * * *